June 30, 1931.  W. H. PRIESS  1,812,664
ELECTRICAL CONDENSER AND METHOD OF MAKING IT
Original Filed Dec. 5, 1921

INVENTOR
*William H. Priess*
BY
*Philip Farnsworth* ATTORNEY

Patented June 30, 1931

1,812,664

UNITED STATES PATENT OFFICE

WILLIAM H. PRIESS, OF MONTCLAIR, NEW JERSEY, ASSIGNOR TO WIRELESS SPECIALTY APPARATUS COMPANY, OF BOSTON, MASSACHUSETTS, A CORPORATION OF NEW YORK

ELECTRICAL CONDENSER AND METHOD OF MAKING IT

Original application filed December 5, 1921, Serial No. 519,868. Divided and this application filed December 5, 1923. Serial No. 678,552.

The invention relates to electrical condensers.

This application is a division of S. N. 519,868 filed December 5, 1921, which has now eventuated into Patent 1,499,403, dated July 1, 1924, which patent is a continuation in part of S. N. 465,137, filed April 26, 1921, which has now eventuated into Patent 1,558,043, dated October 20, 1925. Also this application is a continuation in part of S. N. 456,903 filed March 30, 1921, which has now eventuated into Patent 1,652,212, dated December 13, 1927 and which in turn is a continuation in part of S. N. 332,421, filed October 22, 1919, which has eventuated into Patent 1,695,060 dated December 11, 1928.

The type of condenser embodying the present invention is known as a mica condenser inasmuch as it usually comprises a stack composed of alternate sheets of foil and dielectric, the foil consisting preferably of a soft material such as lead or tin, and the dielectric consisting preferably of mica, which is one of the best dielectrics known for this purpose.

The stacks each are made up of sections connected in series with separators between the sections, and are clamped and secured within a suitable casing, the casing preferably in service constituting one of the terminals of the condenser, or an electrical connection between stacks.

Figure 1:
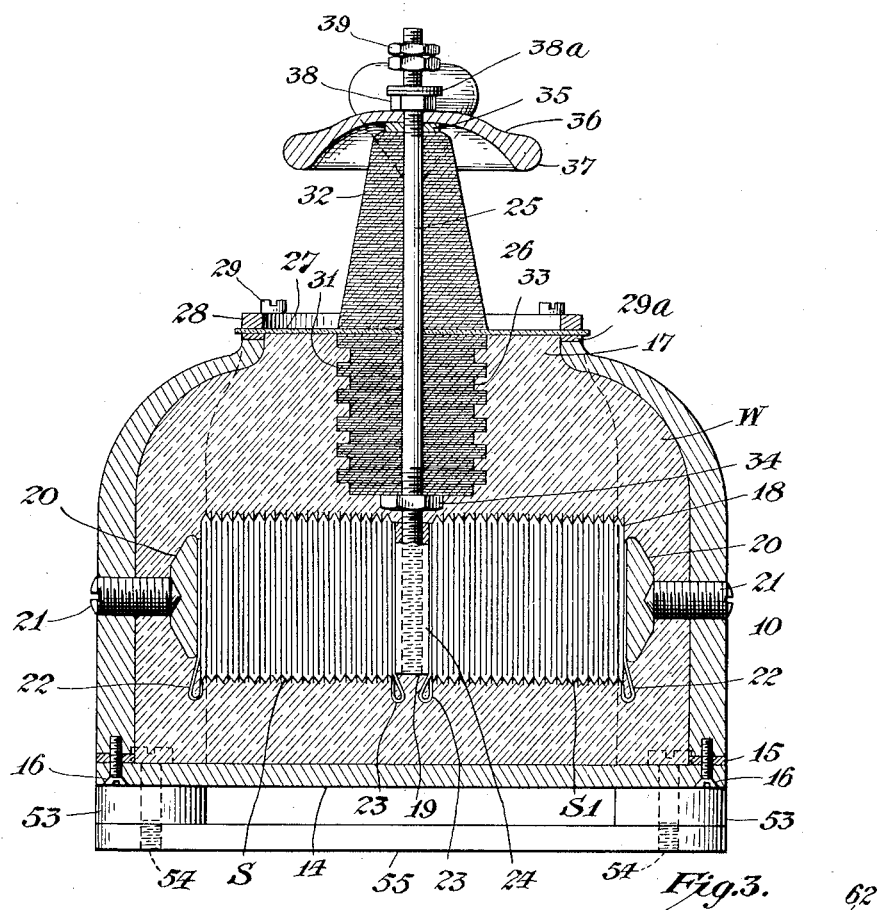
Fig. 1 shows a longitudinal section of one embodiment of this invention.
Figure 2:
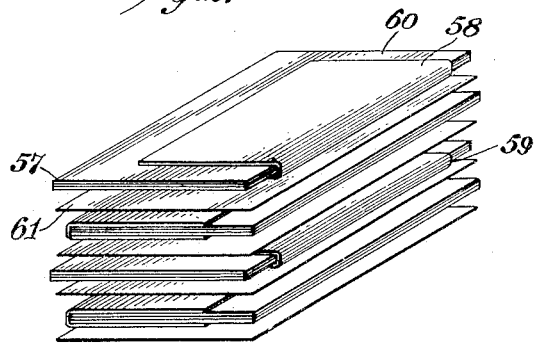
Fig. 2 shows a detail of the stack construction.
Figure 3:
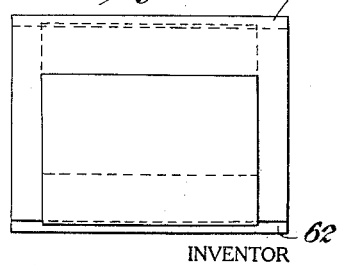
Fig. 3 is a top plan view of the construction shown in Fig. 2.

In Figs. 2 and 3 of the accompanying drawings, I have illustrated a form of stack which I prefer for use in the form of the condenser illustrated in Fig. 1, although the stack of Figs. 2 and 3 is of general application. The showing in Fig. 2 is an expanded view; that is, the several parts of the stack are shown with intervening spaces to more readily illustrate the construction of the stack and the method of building the same. When assembled in the condenser, the several sheets are in mechanical face contact, being suitably clamped together to form a solid stack (either with or without impregnating material adhering thereto as desired, or according to conditions), the clamping means being such as disclosed in Fig. 1, the stacks SS' illustrated therein being considered stacks of the type shown in Figs. 2 and 3.

My improved stack comprises one or more separators 57, each of which may consist of several layers of mica, permissively and desirably, cheap or defective mica, or they may consist of sheet micanite or other insulating material. Folded or wrapped over opposite faces of each separator, 57, is a foil sheet 58 forming conduction sheets (armatures) on opposite faces of the separator 57. The folded halves of the foil 58 upon opposite faces of separator 57 are spaced inwardly from three edges thereof forming margins 60, as shown in Figs. 2 and 3. The sheets 58 may be very easily folded around the separators with their ends in line, thus properly centering the foil on each separator. The two (physically parallel) folded or wrapped halves of a given foil sheet 58 are, in the example shown, electrically speaking, parts of two separate stack-sections, each of which sections is electrically complete in itself, and two of which sections lie adjacent to one another in the stack, said sections being separated from one another at their opposing faces by a separator 57. For each stack-section consists, in the simple illustrative example shown, of a single good (not defective) thin mica sheet 61, and on the respective faces thereof, two halves of successive folded foil sheets 58. Two successive sections, so constituted, are separated from one another by a section-separator 57, such successive sections being electrically connected together in series with one another by means of the integral bend or fold 59 of the folded foil sheet 58. The terminals of the entire stack are at the ends of the stack of separate sections (see 22, 23 in Fig. 1), since the successive and adjacent, but electrically separate sections, successively spaced from one another at their faces by section-separators 57, are electrically connected in series with one another from end to end of the stack by means of said integral bends or folds 59 of the successive wrapped or folded foil-sheets 58; although every two successive foil-sheets 58 are separated from one another by the thin mica sheets 61 which constitute the dielectrics of the several stack-sections. Heretofore, the practice in such series-sectional condenser stacks has been to employ separate, individual foils for each stack-section, each foil lying (unfolded) in a single plane, and the ends of the foils projecting individually out of the sides of the stack sections; and to obtain the series-connection of sections in the stack, the practice has been to fuse (solder) together such projecting ends of foils from two successive sections, such sets of foils projecting from the same side of the stack. In this invention, as above, the series connection is in a bend or fold 59. In a design of stack having series-connected sections to withstand high potentials but wherein the desired capacitance is low (and, therefore, not many foils for each section), this invention obviates the necessity of the above soldering operation, in addition to reducing the labor-charge in foil pick-up; i. e., only one act of the operative in picking up a foil 58 is needed in lieu of picking up two foils separately and successively as heretofore.

As shown in Figs. 2 and 3, each folded foil-sheet 58 has sufficient length to overlie substantial portions of the adjacent faces of a section-separator 57 and the two mica sheets 61 above and below a separator 57; but the total length of each foil-sheet 58 is sufficiently less than twice the width of section-separator 57 and mica 61 as to leave a foil-free margin along the edges thereof, over which the foil-sheet 58 does not extend; and particularly this results in forming a foil-free margin along that edge of dielectric 61 which is opposite to its edge adjacent which foil-sheet 58 is wrapped. It is the above electrically independent sections which are connected in series with one another by the integral bend or fold 59 of the wrapped foil-sheet 58. One-half (or a little less than half) of the complete separate foil-sheet 58 overlies the good mica sheet 61, which, in the example illustrated, constitutes the dielectric of a stack-section. But the two halves of a given separate foil-sheet 58 overlie the opposite faces of separator 57. As shown in Fig. 2, separator 57 may consist of two or more thin sheets, preferably of mica, and permissively and economically (altho not necesssarily) of defective mica otherwise wasted. The effective stack area in the example shown in Figs. 2 and 3 is that area by which the wrapped halves of foils 58 as armatures overlie the good mica-dielectric sheets 61, all of which latter exactly overlie one another in the stack, as shown in Fig. 2.

The method of building a stack embodying the invention (with or without the waxing referred to hereinafter) is illustrated in the expanded view of Fig. 2. A number of combined elements 57—58 are made, that is, by wrapping a foil 58 around a separating sheet 57 to form the integral section-connection 59 at one of the four edges of sheet 57, the other three edges having foil-free margins 60, as shown. Thereafter a good mica sheet 61 is laid at the bottom of the condenser stack to be built (Fig. 2), and on top of it then is laid one of the foil-wrapped insulating sheets 57, with the bend of the foil, say, at the left, as shown. A good mica sheet 61 is laid on top of that. (These single separate good mica sheets 61 may be of the same area as the separators 57, as shown.) Then a second foil-wrapped insulating sheet 57 is laid on top of the top of the said last mica sheet 61, but the foil-fold 59 of this second combined element 57—58 is located on the opposite side (right-hand, as shown) of the condenser stack from the foil-fold (at the left) of the like combined element below it. Thus is formed one complete stack-section consisting of a good separate mica sheet 61 (the second one from the bottom) and of two separate halves of two successive folded foil-sheets 58, said separate halves lying on opposite faces of said mica sheet 61 and insulated from one another by said sheet. Next, another mica sheet 61 is laid on the top of the growing stack. Then a third foil-wrapped insulated separating sheet 57 is laid on top of that, with its foil-wrapped edge at the left. This completes a second stack-section consisting of a good mica dielectric and of foil-sheets on the opposite faces thereof which are separated from one another by the interposed mica sheet 61 itself, constituting the dielectric of the second stack-section. This process may be continued as illustrated in Fig. 2 to produce a stack with additional sections to withstand higher potentials; or the invention may be embodied in other forms of stacks.

Thus each section of a series-sectional stack embodying the invention in the form shown in Figs. 2 and 3 comprises a single good mica sheet 61 and two electrically separate foil-sheets, one on each face of said mica sheet; said two foil-sheets being halves of two separate complete wrapped foil-sheets 58; and each pair of adjacent sections of such construction are electrically connected together in series by the integral band or fold 59 of a complete foil-sheet, which is wrapped around an insulating sheet 57 between such two stack-sections.

The wrapping of a foil-sheet over one edge of separator 57 leaves the opposite edge free of foil, which free edge projects from the stack (Fig. 1) so as to lie between two successive integral connections 59 on the same side of the stack, and serves to insulate and separate from one another each two successive and adjacent stack-sections, each comprising a mica dielectric 61 and foils on opposite faces thereof. This opposite projection of successive separators 57 is shown at 62 in Fig. 3, and in Fig. 2 where the second and fourth separators 57 from the bottom lie a little to the left of the first and third separators 57 from the bottom, said second and fourth separators therefore projecting from the left of the stack; the right-hand edge of said second and fourth separators from the bottom lying a little to the left of the right-hand edge of mica dielectric section-sheets 61, as well as a little to the left of the right-hand edge of the first and third separators 57 from the bottom.

The separators 57 need not be of insulating material because the foil portions on the opposite sides of each separator are connected together at 59; but when, as is shown in Figs. 2 and 3, the separators 57 have the same outline or configuration as the dielectrics 61, it is advantageous to constitute 57 of insulating material because then there is no conductor extending from the foils to the edges of the stack to be liable to cause flash-over at such edges from an armature of one potential at an adjacent armature of different potential.

The increase in length of the stack by a thick separator 57 (whether composed of one or several layers of insulating material or conducting material) is not only unobjectionable as compared with the economy resulting from the use of the invention, but it is affirmatively advantageous in the high potential condenser disclosed, in that the plurality of separators 57 so increases the distance between the ends of the stack as to materially reduce the liability to flash-over through the usual insulating embedment W of Fig. 1, such as wax, and even more so through air.

The construction above described, or equivalent of it within the scope of the invention, is of distinct advantage in being easy to assemble at low cost, and is of special advantage where a stack of low capacity and relatively high voltage is required, as in Fig. 1.

The stacks of the present invention, as illustrated in Fig. 1, may be assembled, in part, by the process described in my copending application Serial No. 456,903, filed March 30, 1921. The process therein described covers the manufacture of a stack by preliminary dipping the individual sheets of mica in suitable insulating material, such as molten paraffin, and building what is called the material stack consisting of alternate sheets of foil and dielectric, the sections being assembled and connected by any desired method, such as that illustrated in Figs. 1 and 2, and then treating the material stack thus formed in molten insulating material, such as paraffin, and applying high compression, and cooling, forming a solid block.

The construction above described or equivalent of it within the scope of the invention is of distinct advantage in being easy to assemble at low cost, and is of special advantage where a stack of low capacity and relatively high voltage is required as in Fig. 1. The cost reduction includes both metal and labor.

The highest saving is in mica, which is the item of highest cost in mica condensers; and in the construction disclosed, the folding or wrapping of the foils around section-separators 57 permits the greater proportion of mica in the entire stack to consist of defective mica sheets, if desired, thereby not only obviating the necessity of using good mica sheets thruout the stack, but affecting a double saving in permitting the use of mica which otherwise would be entirely wasted. The foils are cheap and the extra amount of foil here used at the folds or series-connections 59 in Figs. 2–3 is immaterial.

As to labor cost, since the operative can fold the foils as readily around separators 57 as to build up a stack of unfolded foil sheets (i. e., two separate foils instead of each folded foil 58), there is no extra cost in such folding; and the labor saving is in the operative's pick-up of foils, which is reduced 50% by this invention.

The net saving in micas and labor is an important factor, which greatly reduces the total cost of the condenser, the cost of the stack being the principal item in the cost of the complete condenser shown in Fig. 1.

The stacks of the present invention as illustrated in Figs. 2–3 may be assembled in a complete condenser as shown in Fig. 1, which, however, shows, for the purpose of comparison, the prior construction of stacks. That is, the stacks as shown in Figs. 2–3 are to be substituted for the stacks S, S1, of Fig. 1 and the compressing means and terminals thereof. In Fig. 1, the central metal stud 25 is the high potential terminal of the condenser, and the metal casing is the low potential terminal; stud 25 being connected to the facing ends of the two stacks; the casing 10 being connected to the other ends of the stacks; and all the stack-sections being separated from one another by the insulating separators (57 of Figs. 2–3) which project from the sides of the stacks, as do the prior art section-separators shown in Fig. 1. Of course, the stacks of Figs. 2–3 may be assembled in a complete condenser in other ways, Fig. 1 being merely an illustration of an actual commercial assembly.

The stacks of this invention may be processed in part by the process described in my copending application Serial No. 456,903, filed 30 March 1921.

After the stacks SS', including the separators, have been waxed and compressed, cooled and tested, they are in condition to be handled, being cold and covered with wax, and are directly secured within the casing 10 by means of the clamping members 20 and adjusting screws 21 in the manner above described (Fig. 1). The terminal gaskets 29a are then positioned (Fig. 1) and terminals 25 threaded into block 19 (Fig. 1). The insulators 26, around terminals 25 (Fig. 1), including the disks 27, are then clamped to the casing by means of rings 28 and screws 29. The bells 36 and remaining nuts are then assembled and spark-gap device 42 properly located.

After all the parts have been assembled as illustrated in the drawings, with stacks SS' held under sufficient pressure to hold them in place, the whole condenser can be inverted, the bottom 14 being removed, and casing 10 filled with insulating material W, preferably molten paraffin or oil, in the manner described in my application 456,903 above mentioned, to provide a compact, non-porous, holosteric embedment W for the stacks and around the bushings and terminals within the casing 10, which is free from air and voids. As described in such application 456,903, a head or extension is secured to the casing and the casing and extension are preliminarily heated by filling the same with molten paraffin at a temperature around 140° C. While thus filled, the final pressure is applied to stacks SS' by tightening up screws 21. The molten paraffin is then removed and vacuum applied and the casing and extension filled with molten paraffin or other insulating filler, which is allowed to solidify from the bottom upwardly in the manner described in said application 456,903. In some cases, the preliminary heating with paraffin may be omitted and the stacks SS' finally clamped under high pressure as soon as positioned. The condenser stacks and terminals 25 are then embedded, and the head and surplus wax or insulating material removed as described in said application 456,903. After the embedment, the bottom 14 with its intervening gasket 15, is secured in place by means of the screws 16.

I claim:—

1. In an electrical condenser-stack of the type characterized by a plurality of sheets of dielectrics and metal foil armatures, the stack being separated by spacing sheets into a plurality of sections which are electrically connected in series for high potential service, the improvement which consists of folded foil-sheets around an edge of the section-spacing sheets, whereby the foil-folds constitute the series-connections between the successive stack-sections; the lengths of the folded foil-sheets being approximately twice the width of the spacing sheets; a foil-free margin being left at the ends of such folded foil-sheets and at the edges of the spacing sheets opposite to those around which the foil-sheets are folded; the folds of successive folded foils being spaced peripherally of the stack with respect to one another.

2. An electrical sheet condenser-stack comprising dielectric sheets, metal foil sheets, and spacing sheets, a foil sheet doubled around an edge of a spacing sheet, and each half of such folded foil sheet lying face to face with a dielectric sheet, the length of the folded foil sheets being approximately twice the width of said spacing sheets.

3. An electrical condenser-stack comprising a plurality of foil sheets and dielectric sheets separated into sections by spacing sheets for high potential service, the successive sections being electrically connected together by foil sheets as armatures, which are doubled around an edge of said spacing sheets, the lengths of the folded foil sheet armatures being approximately twice the width of the spacing sheets.

4. An electrical condenser-stack comprising a plurality of foil sheets and dielectric sheets separated into sections by spacing sheets for high potential service, each section respectively on opposite sides of a spacing sheet comprising, for low capacity service, a single pair of foil sheets and a single dielectric sheet between said pair of foil sheets, the two foil sheets on opposite sides of the spacing sheet being halves of a single foil sheet which is folded over an edge of the spacing sheet, the length of the folded foil sheet being approximately twice the width of the spacing sheet.

5. A condenser comprising a plurality of sections composed of conducting elements and intervening sheets of mica of good dielectric properties and a separator of relatively thicker inferior grade mica between each pair of sections and having adjacent conducting elements upon opposite faces thereof integrally connected together around an edge of the separator.

6. An electrical condenser stack comprising a plurality of substantially rectangular sheets of dielectrics and metal foil armatures separated into sections by substantially rectangular spacing sheets; the foil sheets in two adjacent sections so spaced being doubled by being folded over one edge of the intervening spacing sheet; the lengths of the folded foil sheets being approximately twice the width of the spacing sheets; and the folds of the foil sheets around successive spacing sheets being located at opposite sides of the stack.

7. A series-sectional high potential electrical condenser-stack comprising sheets of dielectric and of metal foil armatures; spacing sheets separating the successive sections from one another; and the foil armatures comprising sheets in length approximately one-half the linear dimension of the spacing sheets and folded over an edge of the latter, leaving a margin at the opposite edge thereof; said foil-wrapped spacing sheets being disposed in the stack angularly with respect to one another, whereby the folds of successive foil armatures lie at different sides of the stack, and the foil-free margins of the spacing sheets lie between two foil-folds at the same side of the stack.

8. An electrostatic condenser comprising a stack of sheets, said stack-sheets comprising armature sheets and sheets of insulating material, said armature sheets comprising at least one pair of metal foils the individuals of which pair have their facing-together surfaces spaced from one another and their facing-away surfaces lying respectively adjacent to different dielectric sheets of the stack whereby each individual of the pair acts separately as an armature, but said pair being constituted of a single foil sheet folded at its middle and thereby constituting an electrical connection between the individual separately acting armatures of the pair, said folded middle portion extending outside of the stack as a common terminal for the two armatures of the connected pair.

9. A high potential, low-capacity condenser comprising a plurality of thin sections, each consisting of a thin dielectric sheet and two thin foil armatures on the respective faces of such sheet; and spacing-sheets between the successively adjacent stack-sections and increasing the thickness of the stack of thin sections for the application of higher potentials across the condenser terminals without resulting flashover; said foil armatures respectively being folded around the edges of the spacing-sheets and their folded bends connecting successive thin sections together.

WILLIAM H. PRIESS.